US 12,088,219 B2

United States Patent
Kwon et al.

(10) Patent No.: US 12,088,219 B2
(45) Date of Patent: Sep. 10, 2024

(54) MULTI-DIRECTIONAL ENERGY HARVESTER

(71) Applicants: Hyundai Motor Company, Seoul (KR); Kia Corporation, Seoul (KR)

(72) Inventors: Dae-Sung Kwon, Seoul (KR); Il-Seon Yoo, Suwon-si (KR); Jang-Hyeon Lee, Gunpo-si (KR); Dong-Gu Kim, Suwon-si (KR); Hyun-Soo Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 116 days.

(21) Appl. No.: 18/151,557

(22) Filed: Jan. 9, 2023

(65) Prior Publication Data
US 2024/0048077 A1   Feb. 8, 2024

(30) Foreign Application Priority Data
Aug. 2, 2022   (KR) .................. 10-2022-0096201

(51) Int. Cl.
*H02N 2/18*   (2006.01)
*H02N 1/04*   (2006.01)
*H02N 11/00*  (2006.01)

(52) U.S. Cl.
CPC ................. *H02N 11/002* (2013.01)

(58) Field of Classification Search
CPC ........ H02N 11/002; H02N 11/00; H02N 2/18; H02N 2/186; H02N 2/183; H02N 2/0065; H02N 1/00; H02N 1/04; H02N 1/06; H02N 1/08; F03G 7/08
See application file for complete search history.

(56) References Cited

U.S. PATENT DOCUMENTS

| | | | |
|---|---|---|---|
| 6,198,201 B1 * | 3/2001 | Okumura | H02N 2/163 310/323.03 |
| 9,906,171 B2 | 2/2018 | Chen et al. | |
| 10,840,827 B2 * | 11/2020 | Toshiyoshi | H02N 1/08 |
| 2021/0202825 A1 | 7/2021 | Pouyadou et al. | |

(Continued)

FOREIGN PATENT DOCUMENTS

| | | | | |
|---|---|---|---|---|
| CN | 105490579 A | * | 4/2016 | ............ H02N 1/04 |
| CN | 110504860 A | * | 11/2019 | |

(Continued)

OTHER PUBLICATIONS

Niu, S., et al., "Theoretical systems of triboelectric nanogenerators," Science Direct, Nano Energy, vol. 14, May 2015, 93 pages.

*Primary Examiner* — Edgardo San Martin
(74) *Attorney, Agent, or Firm* — Slater Matsil, LLP (57) ABSTRACT

An embodiment multi-directional vibration energy harvester includes a fixing part in which fixed discs of a conductive material are stacked spaced apart from each other and electrically connected to each other and a vibration unit in which vibration discs are arranged to be spaced apart from each other with the vibration discs being alternately stacked with the fixed discs, wherein the fixed discs and the vibration discs are arranged so that as an arrangement distance between a vibration disc of the vibration discs and a fixed disc of the fixed discs is changed by an external force, an electron moves between the vibration disc and the fixed disc.

20 Claims, 8 Drawing Sheets

(56) References Cited

U.S. PATENT DOCUMENTS

| | | | |
|---|---|---|---|
| 2022/0109384 A1* | 4/2022 | Hwang | H02N 1/04 |
| 2024/0022184 A1* | 1/2024 | Kwon | H02N 1/04 |

FOREIGN PATENT DOCUMENTS

| | | | | |
|---|---|---|---|---|
| CN | 110994936 A | | 4/2020 | |
| CN | 111525838 A | | 8/2020 | |
| CN | 112202363 A | * | 1/2021 | H02N 2/186 |
| CN | 113078846 A | | 7/2021 | |
| JP | 2021500842 A | | 1/2021 | |
| KR | 20140001061 A | | 1/2014 | |
| KR | 101417848 B1 | | 7/2014 | |
| KR | 101920321 B1 | | 11/2018 | |
| KR | 20240007519 A | * | 1/2024 | H02N 2/18 |
| WO | WO-2017045910 A1 | * | 3/2017 | |

\* cited by examiner

MULTI-DIRECTIONAL ENERGY HARVESTER

CROSS-REFERENCE TO RELATED APPLICATIONS

This application claims the benefit of Korean Patent Application No. 10-2022-0096201, filed on Aug. 2, 2022, which application is hereby incorporated herein by reference.

TECHNICAL FIELD

The present disclosure relates to an energy harvester.

BACKGROUND

An energy harvester converts external energy into electricity by combining triboelectric effect and electrostatic induction principles.

That is, when a contact occurs between different friction surfaces, electrons move (triboelectric effect) between friction surfaces due to a difference in electronegativity, and when a relative motion between the friction surfaces bearing surface charges occurs, electrons move (electrostatic induction) due to the influence of an electric field.

Due to the contact between two different interfaces (solid-solid, solid-liquid, liquid-liquid contact), it is possible to convert mechanical stimuli into a signal having a high magnitude, and select a wide range of materials.

However, there is a problem of deterioration in performance due to durability and contamination of the contact surface, and there is a limitation in that an output is greatly reduced in an environment with high humidity.

As a surface charge density increases, higher output occurs (surface charge density ó has a large effect on the output), and it is possible to improve the harvester output by increasing the surface charge density through the selection of the contact surface material and the surface modification.

It may be classified into the following four driving modes according to an electrode configuration and a driving method:

1) Vertical contact-separation mode;
2) Lateral sliding mode;
3) Single-electrode mode; and
4) Freestanding triboelectric-layer mode.

Among these driving methods, the vertical contact-separation mode may utilize periodic contact/separation by an external force applied to the two friction surfaces where a gap is formed through springs, spacers, etc., move electrons according to an electrification sequence by the initial contact, and then, move the electrons of the electrode when the gap between the two friction surfaces changes and the contact/separation occurs and harvest energy.

One or more dielectric layers are used to prevent a short between the two contact surfaces, and the layer can be configured in the following two types: electrode/insulating layer-insulating layer/electrode and electrode/insulating layer/electrode.

Examples of utilizing these may include a harvester borrowing a gyroscope structure, a harvester utilizing structure rotation and a change in a contact area by eccentric mass rotation, a harvester manufactured in a stacked structure in an origami type to increase contact/separation area, and the like.

However, it is possible to harvest energy when the multi-directional vibration is applied using mass, eccentric mass, and the like that can freely move inside the case, but there is a problem in that the contact area is small, it is difficult to form electrodes and wirings, noise occurs by the movement of a bead-shaped mass, and the like.

In addition, the harvester output can be improved according to the increase in the contact area when manufacturing the stacked structure, but it can respond only to unidirectional vibration, it is difficult for all contact surfaces to be contacted/separated at the same time, and a slight large stroke is required for driving.

The contents described in this section are to help the understanding of the background of embodiments of the present disclosure, and may include what is not previously known to those skilled in the art to which the present disclosure pertains.

SUMMARY

The present disclosure relates to an energy harvester. Particular embodiments relate to an energy harvester specialized for multi-directional vibration.

Embodiments of the present disclosure can solve problems occurring in the art, and an embodiment of the present disclosure provides a multi-directional energy harvester that is more efficient and applicable to automobiles.

A multi-directional vibration energy harvester according to one embodiment of the present disclosure includes a fixing part in which a plurality of fixed discs of a conductive material are stacked spaced apart from each other and electrically connected to each other and a vibration unit in which a plurality of vibration discs are arranged to be spaced apart from each other, and the vibration discs are alternately stacked with the fixed discs, in which, as the arrangement distance between the vibration disc and the fixed disc changes by an external force, an electron moves between the vibration disc and the fixed disc.

The vibration disc may be made of a conductive material or a flexible material.

The vibration unit may further include a cylindrical vibration column, and the vibration discs may be each coupled to the vibration column and stacked.

A screw thread may be formed on an outer side of the vibration column, the vibration discs may have a coupling hole formed in a center thereof, and a screw thread formed on an inner side of the coupling hole may be coupled with the screw thread formed on the vibration column.

The vibration discs may be formed with a stacked part extending in a vertical direction from an inner circumferential surface, and the vibration discs may be spaced apart from each other and stacked by the stacked part formed on the vibration discs.

The vibration discs may be coupled to the vibration column by the screw thread formed on the inner surface of the stacking part.

The vibration unit may further include an elastic member of which one end portion is coupled to a lower end of the vibration column, and a bending deformation may occur based on the other end portion to which the elastic member is fixed by the external force.

The fixed discs may be provided with a stepped part extending in a vertical direction from an outer circumferential surface, and the fixed discs may be spaced apart from each other and stacked by the stepped part formed on the fixed discs.

The fixed discs may be coupled to the fixed discs arranged in an upper layer or a lower layer by a thread formed at an upper end portion or a lower end portion of the stepped part.

The fixed discs may have a hole through which the vibration column penetrates formed in the center thereof.

A multi-directional vibration energy harvester according to another embodiment of the present disclosure includes a fixing part that includes a plurality of fixed discs made of a conductive material and having a stepped part extending in a vertical direction from an outer circumferential surface, the fixed discs being electrically connected to each other by stepped parts formed in the fixed discs, and a vibration unit in which a plurality of vibration discs are arranged to be spaced apart from each other, and the vibration discs are alternately arranged with the fixed discs, in which the vibration discs have a coupling hole formed in a center thereof and a stacked part extending in a direction perpendicular to an inner circumferential surface thereof, and the vibration discs are formed in a structure in which the stacked parts are sequentially stacked.

The vibration unit may further include a cylindrical vibration column of which the outer side is provided with a screw thread, the vibration discs may be provided with the screw thread formed on the inner surface of the stacking part, and the screw thread formed on the inner surface of the stacking part may be coupled to the screw thread formed on the vibration column.

The vibration unit may further include an elastic member of which one end portion is coupled to a lower end of the vibration column, and a bending deformation may occur based on the other end portion to which the elastic member is fixed by the external force.

The fixed discs may be coupled to the fixed discs arranged in an upper layer or a lower layer by a thread formed at an upper end portion or a lower end portion of the stepped part.

DETAILED DESCRIPTION OF ILLUSTRATIVE EMBODIMENTS

In order to sufficiently understand embodiments of the present disclosure, operational advantages of embodiments of the present disclosure, and objects accomplished by exemplary embodiments of the present disclosure, the accompanying drawings illustrating exemplary embodiments of the present disclosure and contents described in the accompanying drawings should be referred to.

In describing preferred embodiments of the present disclosure, well-known techniques or repetitive descriptions that may unnecessarily obscure the gist of the present disclosure will be reduced or omitted.

Figure 1:
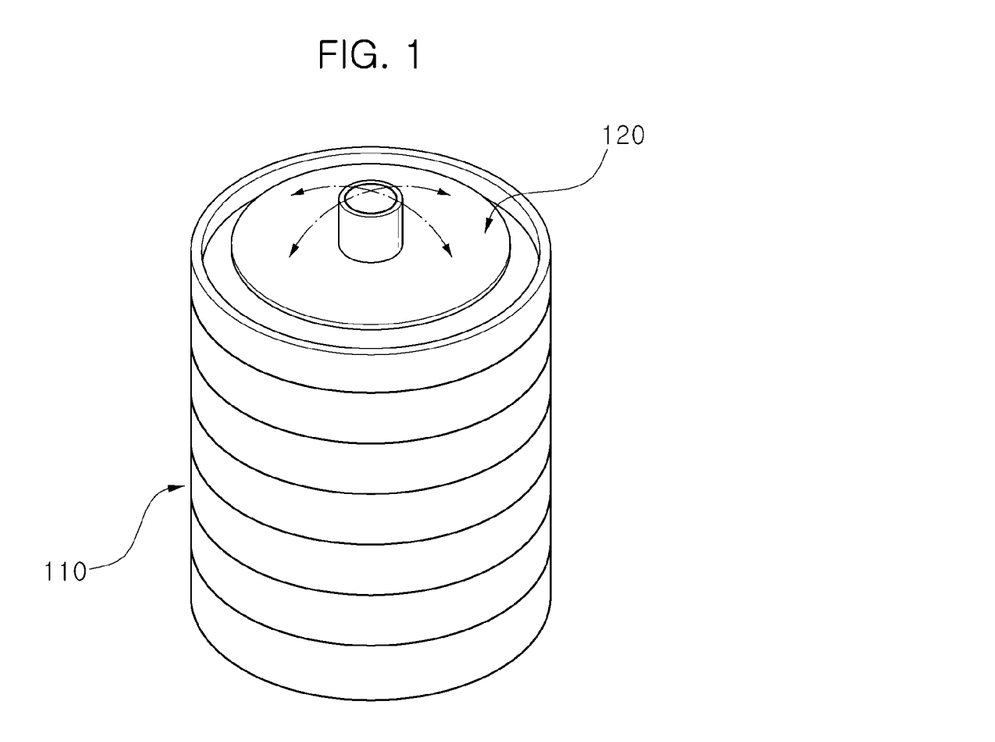
FIG. 1 is a diagram illustrating a multi-directional energy harvester of embodiments of the present disclosure.
Figure 2:
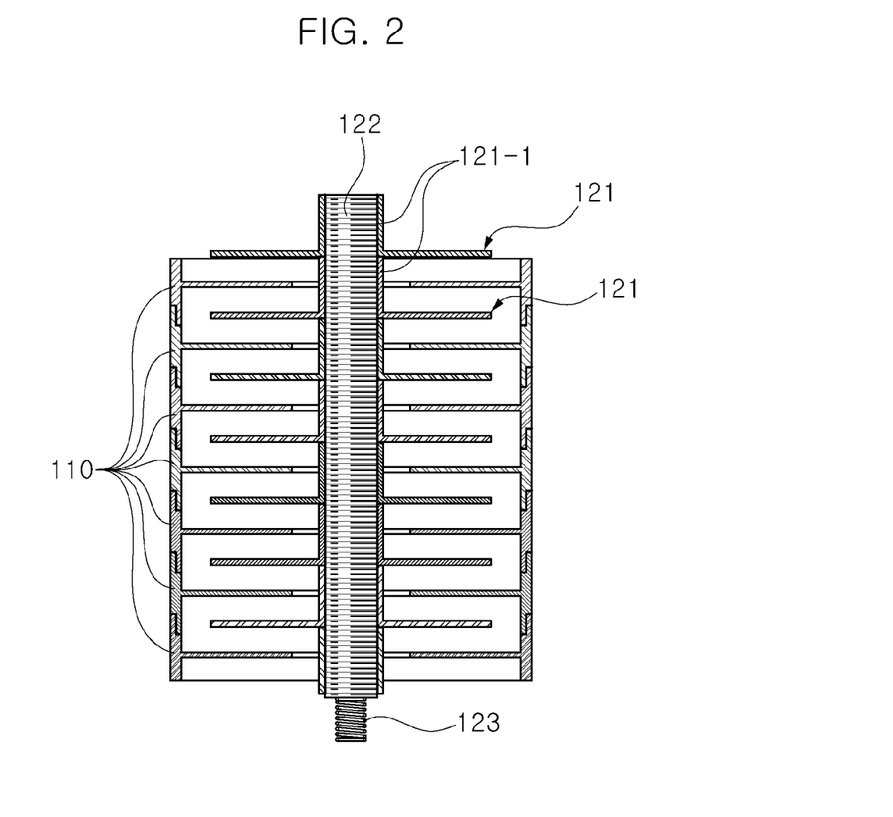
FIG. 2 is a diagram illustrating a cross-sectional shape of FIG. 1.
Figure 3:
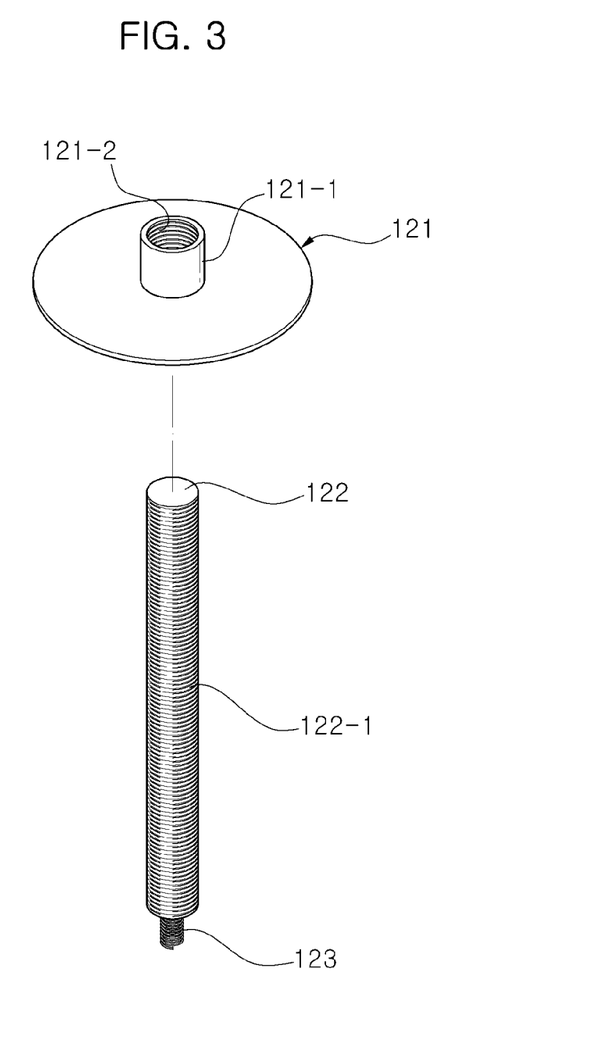
FIGS. 3 to 5 are diagrams illustrating a part for the description of the multi-directional energy harvester of embodiments of the present disclosure.
Figure 4:
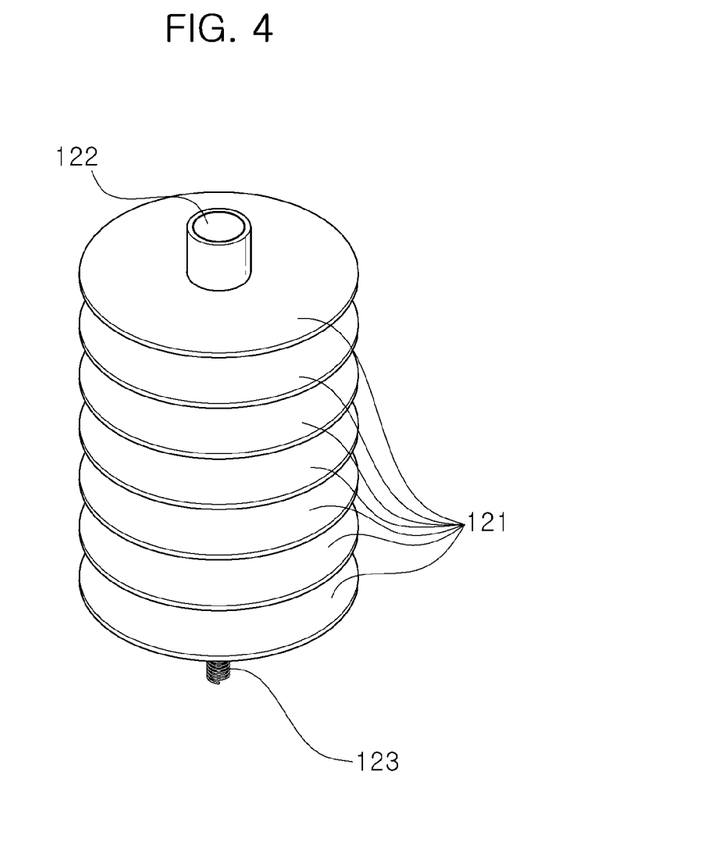
Figure 5:
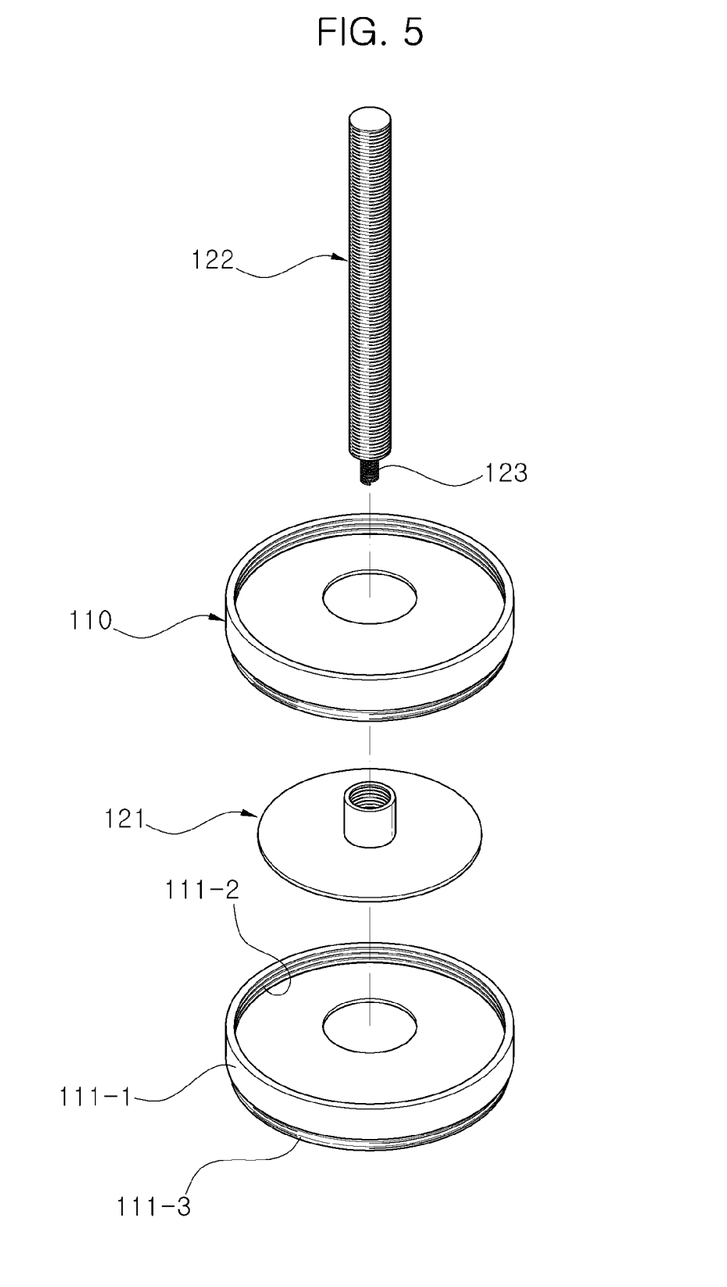

FIG. 1 illustrates a multi-directional energy harvester of embodiments of the present disclosure, and FIG. 2 illustrates a cross-sectional shape of FIG. 1. FIGS. 3 to 5 are diagrams illustrating a part for the description of the multi-directional energy harvester of embodiments of the present disclosure.

Hereinafter, the multi-directional energy harvester according to an embodiment of the present disclosure will be described with reference to FIGS. 1 to 5.

Embodiments of the present disclosure relate to a multi-directional vibration energy harvester of a triboelectric charging method, and the harvester may apply to a vehicle or the like that generates vibrations in various directions depending on driving conditions to more efficiently harvest energy.

The harvester of embodiments of the present disclosure has a structure in which a contact/separation type triboelectric charging harvester is stacked, and has a structure in which a fixed disc 111 and a vibration disc 121 as a conductive disc are stacked to maintain regular intervals, and a vibration column 122 is deformed in all directions by an elastic member 123 such as a spring to change a spacing and a contact area change between the fixed disc 111 and the vibration disc 121 when external vibration is applied, so energy harvesting is possible.

The harvester includes a fixing part no and a vibration unit 120, and the fixing part 110 is configured by stacking a plurality of fixed discs 111.

Each fixed disc 111 in may be of a disc type and is made of a conductive material.

As illustrated, a plurality of fixed discs 111 are coupled to each other and have a structure in which the plurality of fixed discs 111 are stacked at regular intervals.

Each fixed disc 111 has a central hole formed in the center thereof so that the vibration column 122 and the vibration disc 121 to be described later may penetrate through the hole, and the plurality of fixed discs 111 are stacked at regular intervals to form a gap with the vibration disc 121 so that each fixed disc 111 is provided with a stepped part 111-1 extending in a vertical direction from an outer circumferential surface.

The stepped part 111-1 may be formed to extend only in one direction perpendicular from the outer circumferential surface of the fixed disc 111 or may be formed to extend in both vertical directions.

The coupling between the stepped parts 111-1 are made in a way that the screw thread 111-2 formed at an upper end portion of the stepped part 111-1 is coupled to a screw thread 111-3 formed at a lower end portion of the stepped part 111-1 of the upper fixed disc 111, and is formed in a structure electrically connected between the stacked fixed discs 111 by being coupled between the stepped parts 111-1 in this way, and the lowermost fixed disc 111 may be connected to a separate power storage unit through a wire.

Next, the vibration unit 120 includes the vibration disc 121 and the vibration column 122.

The vibration column 122 may be a cylindrical column extending in a certain longitudinal direction, and a plurality of vibration discs 121 are laminated and coupled to an outer surface of the vibration column 122 in a form penetrating through the vibration disc 121 to form a vibration unit 120.

The vibration disc 121 may be of a disc type and is made of a conductive material or a flexible material. When the vibration disc 121 is made of a non-conductive material, energy harvesting is possible in the form of utilizing a single electrode of the fixed disc 111.

As illustrated, a screw thread 122-1 may be formed on the outer circumferential surface of the vibration column 122 in order to be coupled to the outer surface of the vibration column 122 in the structure in which the plurality of vibration discs 121 are stacked at regular intervals.

In addition, each vibration disc 121 has a coupling hole formed in the center thereof, and thus, the vibration column 122 is coupled to penetrate through the coupling hole, and the screw thread corresponding to the screw thread formed on the outer circumferential surface of the vibration column 122 is formed on the inner side of the coupling hole of each vibration disc 121, so the vibration column 122 is inserted into the vibration discs 121 and stacked.

Further, a stacked part 121-1 extending in the vertical direction from the inner circumferential surface is formed for smooth coupling and maintenance of a stacking interval between the vibration discs 121, and a screw thread 121-2 is formed on the inner side of the stacked part 121-1, so the vibration discs 121 are sequentially stacked and coupled to the vibration column 122.

The stacked part 121-1 may be formed to extend only in one direction perpendicular from the inner circumferential surface of the vibration disc 121 or may be formed to extend in both vertical directions.

Importantly, unless an external force acts as illustrated, the fixed disc 111 and the vibration disc 121 have the structure in which the fixed disc 111 and the vibration disc 121 are arranged to be stacked so as to be spaced apart from each other in a height direction. That is, the fixed discs 111 and the vibration discs 121 are alternately arranged in the height direction.

Therefore, for example, the fixed disc 111 is first arranged at the lowermost end, the vibration column 122 is arranged in the central hole, and the vibration disc 121 arranged at the lowermost end is first coupled to the vibration column 122. Next, the second fixed disc 111 from the lower end is coupled by the stepped part 112 and the screw thread of the lowermost fixed disc 111, and then the second vibration disc 121 is coupled to the vibration column 122.

As such, the fixed discs 111 and the vibration discs 121 are coupled sequentially alternately, so the fixed discs 111 are maintained at regular intervals from each other, the vibration discs 121 are maintained at regular intervals from each other, and the fixed discs 111 and the vibration discs 121 are stacked to be spaced apart from each other.

Figure 6:
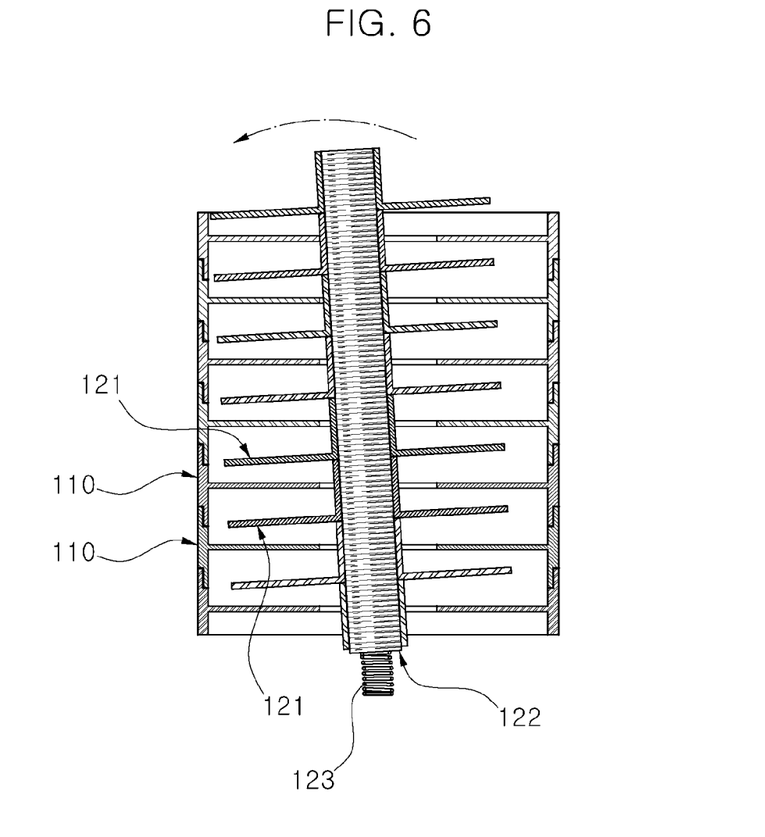
FIGS. 6 and 7 are diagrams illustrating an operating state of the multi-directional energy harvester of embodiments of the present disclosure.
Figure 7:
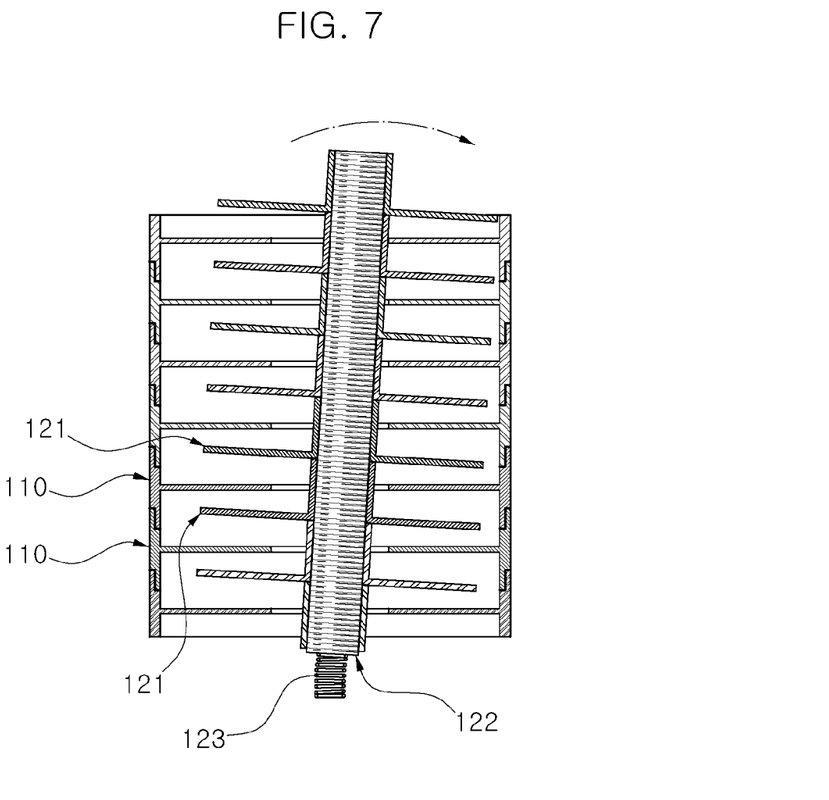

Next, one end portion of the elastic member 123, such as a spring, is coupled to a lower end of the vibration column 122, and the omnidirectional bending deformation of the elastic member 123 based on the fixed other end portion of the elastic member 123 when an external force is generated as illustrated in FIGS. 6 and 7 occurs, so the vibration column 122 vibrates in a multi-directional manner.

As illustrated, the vibration disc 121 forms a certain angle with respect to the horizontal plane and by comparing to before the external force is generated by this vibration, the change in the gap with the fixed disc 111 changes, and the contact occurs.

Figure 8:
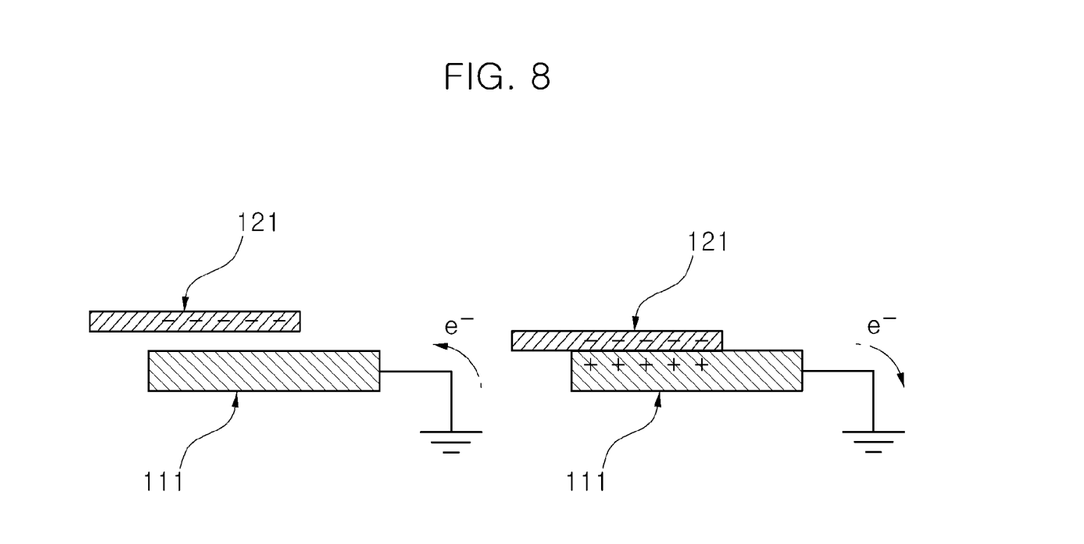
FIG. 8 is a diagram illustrating a generation of electron movement during the operation as illustrated in FIGS. 6 and 7.

As a result, as illustrated in FIG. 8, a difference in electronegativity occurs due to the change in the distance between the vibration disc 121 and the fixed disc 111, and the movement of electrons occurs through the ground connected to the fixed disc 111 at the time of contact.

Thereafter, when the distance changes, electrons move through a conductor connected to the ground, so energy harvesting becomes possible.

Figure 9:
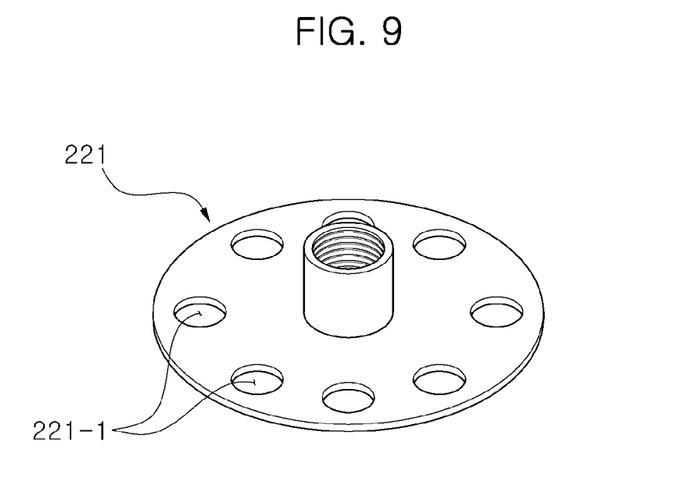
FIGS. 9 and 10 are diagrams illustrating another embodiment of a conductive disc of embodiments of the present disclosure.
Figure 10:
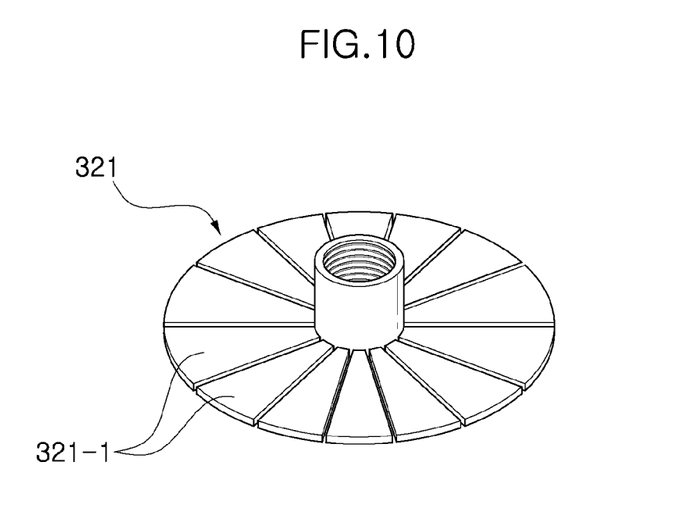

Next, FIGS. 9 and 10 illustrate another embodiment of the vibration disc of embodiments of the present disclosure, and such a form is also applicable to the fixed disc.

That is, since the harvester of embodiments of the present disclosure has a structure in which the fixing part and the vibration unit are alternately stacked and has a form in which the disc-shaped structure vibrates, it is possible to deform the disc shape for improving vibration efficiency and increasing the contact area.

First, a vibration disc 221 of FIG. 9 is provided with a hole for a decrease in damping, and the vibration unit disc structure is provided with a through-hole 221-1 in order to improve a decrease in amplitude due to squeeze film damping.

The plurality of through-holes 221-1 may be disposed at regular intervals on a concentric circle having a constant radius from the center of the vibration disc 221.

A vibration disc 321 of FIG. 10 is a disc manufactured in a separated structure so as to be easily deformed.

That is, in order to further increase the contact area when the vibration disc and the fixed disc are in contact, it is applicable as a disc having a structure separated in a cantilever shape.

That is, the plurality of disc pieces 321-1 extending in a radial direction with the same length and the same width from the central portion may be formed to be spaced apart from each other at regular intervals along a circumferential direction.

As described above, the multi-directional vibration energy harvester of embodiments of the present disclosure is a device capable of harvesting energy with a more efficient and simple configuration by being applied to the environment such as a vehicle in which the vibration direction is variously applied.

According to the multi-directional energy harvester of embodiments of the present disclosure, it is possible to stably harvest energy even if a direction of a vehicle or the like, in which a direction of vibration to be used as an energy source changes frequently, changes.

In addition, it is possible to maximize a space to which a harvester is applied through a stacking method that does not significantly increase the volume.

Although embodiments of the present disclosure have been described with reference to the accompanying drawings, it is obvious to those skilled in the art that the present disclosure is not limited to the exemplary embodiments described above, but may be variously modified and altered within the spirit and scope of the present disclosure. Therefore, these modifications and alterations are to be considered to belong to the claims, and the scope of the present disclosure is to be interpreted on the basis of the claims.

What is claimed is:

1. A multi-directional vibration energy harvester comprising:
   a fixing part in which fixed discs of a conductive material are stacked spaced apart from each other and electrically connected to each other; and
   a vibration unit in which vibration discs are arranged to be spaced apart from each other with the vibration discs being alternately stacked with the fixed discs, wherein the fixed discs and the vibration discs are arranged so that as an arrangement distance between a vibration disc of the vibration discs and a fixed disc of the fixed discs is changed by an external force, an electron moves between the vibration disc and the fixed disc.

2. The multi-directional vibration energy harvester of claim 1, wherein each of the vibration discs comprises a second conductive material or a flexible material.

3. The multi-directional vibration energy harvester of claim 1, wherein the vibration unit further comprises a cylindrical vibration column, and wherein the vibration discs are each coupled to the vibration column and stacked.

4. The multi-directional vibration energy harvester of claim 3, further comprising:
a first screw thread on an outer side of the vibration column;
a coupling hole in a center of each of the vibration discs; and
a second screw thread on an inner side of the coupling hole, wherein the second screw thread is coupled with the first screw thread.

5. The multi-directional vibration energy harvester of claim 4, wherein:
each of the vibration discs comprises a stacked part extending in a vertical direction from an inner circumferential surface; and
the vibration discs are spaced apart from each other and stacked by the stacked part.

6. The multi-directional vibration energy harvester of claim 5, wherein the second screw thread is on an inner surface of the stacking part, and wherein the vibration discs are coupled to the vibration column by the second screw thread.

7. The multi-directional vibration energy harvester of claim 3, wherein:
the vibration unit further comprises an elastic member having a first end portion coupled to a lower end of the vibration column; and
a bending deformation occurs in response to the external force applied to a second end portion of the elastic member opposite the first end portion.

8. The multi-directional vibration energy harvester of claim 3, wherein:
each of the fixed discs comprises a stepped part extending in a vertical direction from an outer circumferential surface; and
the fixed discs are spaced apart from each other and stacked by the stepped part.

9. The multi-directional vibration energy harvester of claim 8, wherein each of the fixed discs is coupled to a neighboring fixed disc arranged in an upper layer or a lower layer by a thread provided at an upper end portion or a lower end portion of the stepped part, respectively.

10. The multi-directional vibration energy harvester of claim 8, wherein each of the fixed discs comprises a hole provided in a center thereof, and wherein the vibration column penetrates the hole.

11. A multi-directional vibration energy harvester comprising:
a fixing part comprising fixed discs, each fixed disc comprising a conductive material and a stepped part extending in a vertical direction from an outer circumferential surface, the fixed discs being electrically connected to each other by the stepped parts; and
a vibration unit comprising vibration discs arranged to be spaced apart from each other and alternately arranged with the fixed discs, wherein each of the vibration discs has a coupling hole in a center thereof and a stacked part extending in a direction perpendicular to an inner circumferential surface thereof, and wherein the vibration discs have a structure in which the stacked parts are sequentially stacked.

12. The multi-directional vibration energy harvester of claim 11, wherein:
the vibration unit further comprises a cylindrical vibration column comprising a first screw thread on an outer side thereof;
each of the vibration discs comprises a second screw thread on an inner surface of the stacking part; and
the second screw thread on the inner surface of the stacking part is coupled to the first screw thread on the outer side of the vibration column.

13. The multi-directional vibration energy harvester of claim 12, wherein:
the vibration unit further comprises an elastic member having a first end portion coupled to a lower end of the vibration column; and
a bending deformation occurs in response to an external force applied to a second end portion of the elastic member opposite the first end portion.

14. The multi-directional vibration energy harvester of claim 13, wherein each of the fixed discs is coupled to a neighboring fixed disc arranged in an upper layer or a lower layer by a thread at an upper end portion or a lower end portion of the stepped part, respectively.

15. A multi-directional vibration energy harvester comprising:
a plurality of fixed discs stacked spaced apart from each other and electrically connected to each other, wherein each of the fixed discs comprises a conductive material; and
a cylindrical vibration column;
a plurality of vibration discs spaced apart from each other and coupled to the vibration column in a stacked arrangement, wherein the vibration discs are alternately stacked with the fixed discs; and
an elastic member having a first end portion coupled to a lower end of the vibration column so that a bending deformation occurs in response to an external force applied to a second end portion of the elastic member opposite the first end portion.

16. The multi-directional vibration energy harvester of claim 15, wherein each of the vibration discs comprises a second conductive material or a flexible material.

17. The multi-directional vibration energy harvester of claim 15, further comprising:
a first screw thread on an outer side of the vibration column;
a coupling hole in a center of each of the vibration discs; and
a second screw thread on an inner side of the coupling hole, wherein the second screw thread is coupled with the first screw thread.

18. The multi-directional vibration energy harvester of claim 17, wherein:
each of the vibration discs comprises a stacked part extending in a vertical direction from an inner circumferential surface; and
the vibration discs are spaced apart from each other and stacked by the stacked part.

19. The multi-directional vibration energy harvester of claim 15, wherein:
each of the fixed discs comprises a stepped part extending in a vertical direction from an outer circumferential surface; and
the fixed discs are spaced apart from each other and stacked by the stepped part.

20. The multi-directional vibration energy harvester of claim 19, wherein each of the fixed discs comprises a hole provided in a center thereof, and wherein the vibration column penetrates the hole.

* * * * *